United States Patent [19]

McClure

[11] 4,288,971
[45] Sep. 15, 1981

[54] ROUND BALER

[75] Inventor: John R. McClure, New Holland, Pa.

[73] Assignee: Sperry Corporation, New Holland, Pa.

[21] Appl. No.: 136,668

[22] Filed: Apr. 2, 1980

[51] Int. Cl.$^3$ .................................. A01D 39/00
[52] U.S. Cl. ............................. 56/341; 100/89
[58] Field of Search ............... 56/341; 100/89, 88

[56] References Cited

U.S. PATENT DOCUMENTS

| | | | |
|---|---|---|---|
| 1,733,434 | 10/1929 | Taft | 100/89 |
| 3,827,223 | 8/1974 | Blanshinig et al. | 100/88 |
| 3,968,632 | 7/1976 | Gaeddert et al. | 56/341 |
| 4,019,309 | 4/1977 | Lundell | 56/341 |
| 4,119,026 | 10/1978 | Sacht | 56/341 |
| 4,205,513 | 6/1980 | Shokoples | 56/341 |

*Primary Examiner*—Paul J. Hirsch
*Attorney, Agent, or Firm*—Martin Fruitman; Frank A. Seemar

[57] ABSTRACT

A roll forming crop baling machine to produce more even bale density, which forms the bale by use of rigid rollers. The set of rollers, one stationary set and another shifting set, are used to form and compress the bale during a major portion of its growth. Each shifting roller gradually moves outward from an initial position near the core of the forming bale which is radially inward from the stationary rollers, to a final position forming a continuous outer boundary with the stationary rollers.

7 Claims, 5 Drawing Figures

ROUND BALER

BACKGROUND OF THE INVENTION

This invention deals generally in crop balers and more specifically in a crop roll forming apparatus.

The technique of forming hay bales into cylindrical or rolled configuration has become more common as the advantages of the particular configuration have become more widely known. The chief such advantage is the self shedding characteristic of a cylinder when exposed to precipitation. This has offered the possibility of leaving such bales in the field for long periods of time and therefore eliminated the need for transporting bales to a building for storage.

There are numerous roll-bale forming machines, or round balers as they are called, both in the patent art and in the market place, and they use a variety of apparatus. Most systems to form the bale include a chamber with a hinged upper frame which operates in a clamshell type fashion to unload the finished bale and some system within the chamber to furnish cylindrical motion to the cut crop.

These motive systems tend to exist in two classes. One type has an expanding cavity in which the motive means begins in a configuration which forms a small bale, maintains compression upon it, and gradually expands to permit the bale to grow to full size. The cylindrical motion is typically imparted to the bale in these devices by a continuous belt or chain system, which permits expansion of the chamber by releasing tension on an idler on the belt or chain as it moves in the return path not in contact with the bale.

The other type of baler has a fixed chamber size with motive means located at the periphery of the chamber. In such a system the bale builds up without outside compression until it reaches its maximum size and then the compression begins. This type system forms a bale relatively loosely packed throughout its interior with a tightly wound outside "shell".

The fixed chamber balers use multiple short length belts or large metal rollers at the outside limits of the chamber to yield the cylindrical motion. While the rollers, particularly, have the advantage of low maintenance requirements and unlimited life, the bale formed by the fixed cavity is less desirable, since in any process of use, once the outer layers are removed the bale loses its configuration and self-supporting characteristic.

It is therefore an objective of the present invention to furnish a round baler which uses low maintenance rollers, but forms a bale which is compressed throughout the greater part of its radius.

It is also an objective of the invention to yield a round baler with rollers as the bale motive means wherein the volume which the rollers enclose expands outward as the bale grows larger.

It is a further objective of the invention to furnish a round baler in which the axes of the cylindrical bale forming rollers shift during the formation of the bale.

SUMMARY OF THE INVENTION

These objectives are attained in the present invention by the use of dual sets of rollers. One set of rollers is stationary in position at the prescribed outer limits of the bale size. These rollers are driven by conventional drive means such as one continuous chain for each half of the clamshell chamber, or individual small chain drives progressing around the chamber from roller to roller.

In the preferred embodiment the rollers of the second shifting set are each driven individually by a chain coupling from each shifting roller to the stationary position roller to which it is adjacent. The shifting rollers are restrained by springs into a position fully radially inward from the stationary rollers. Thus, when the bale begins forming the chamber has a much smaller diameter than it has when its diameter is determined by the outward position of the stationary rollers.

In the preferred embodiment each shifting roller is powered from and orbits around its adjacent stationary roller. With the use of a circular orbit, the drive system for the moveable roller can be a simple chain drive from the fixed roller. In that design, although the distance between the driving and driven roller essentially does not vary, an idler system can be used to adjust for stretch in the chain.

Alternate embodiments, permitting greater changes in the position of the shifting rollers, can also be used. For instance, when the shifting rollers are powered from independent idler gears not aligned with the stationary rollers, the path of the shifting rollers can be increased to greater than the spacing between the stationary and shifting rollers.

Regardless of the drive system, the shifting rollers are pulled into their innermost position by spring action and pushed out to their outermost positions by the growth of the bale. Spring tension settings thus determine the compression of the forming bale. The spring tension can then be controlled to regulate the density of the inner portion of the resulting round bale.

DETAILED DESCRIPTION OF THE INVENTION

Figure 1:
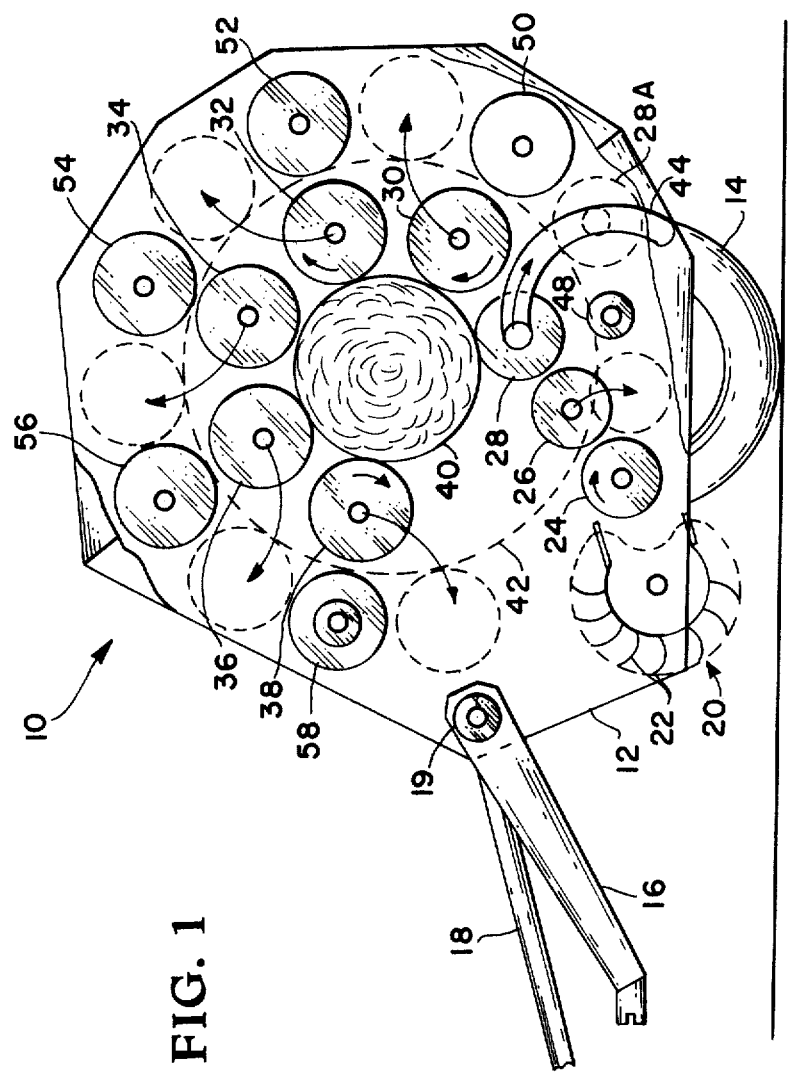
FIG. 1 is a simplified representation of a cutaway side view of the preferred embodiment of a round baler machine showing the orientation and paths of the shifting rollers and the locations of the stationary rollers.

The preferred embodiment of the invention is shown in FIG. 1 in a simplified cutaway view showing part of the structure within a round baler. Round baler 10 is mounted upon frame 12 which rides upon wheels 14 and is pulled behind a tractor (not shown) by means of hitch bar 16. Drive shaft 18, powered from the power take off of the pulling tractor, furnishes mechanical power for baler 10 by utilization of conventional drive chains, driven from gear box 19. Pickup system 20 is arranged to engage, raise and feed a swath or windrow of crop material which is conveyed by tine pickup fingers 22 and fed into contact with the rollers of baler 10.

As the crop is fed into contact with stationary roller 24, the crop is moved, by the clockwise rotation of roller 24, onto shifting roller 26 and subsequently to shifting rollers 28, 30, 32, 34, 36 and 38, all of which also rotate clockwise. Shifting rollers 26 through 38 are all spring loaded into the initial closely grouped positions shown in FIG. 1 to begin compression of the bale when it reaches the size of core 40 of bale 42. As core 40 grows in diameter its growth overcomes the compression force of shifting rollers 26 through 38 and begins pushing the shifting rollers outward.

In the embodiment shown in FIG. 1 each shifting roller moves around its adjacent stationary roller. Stationary rollers 24 and 48 through 58 are located at a radius of expanded grouping to permit growth of the bale to the maximum size as shown by bale 42. As this growth occurs each shifting roller gradually is forced outward until, at bale size 42, the shifting rollers occupy the spaces between the stationary rollers and continue to aid in compressing and rotating bale 42.

Each shifting roller is also pictured in its outermost position in a phantom view generally on the same circle of centers with the stationary rollers. Shifting rollers 26 through 38 move in circular orbits around their associated stationary rollers as core 40 grows to the size of bale 42. The guide slot 44, built into side sheets (not shown) of frame 12 shows a typical arrangement for restraining the movement of shifting roller 28 and maintaining the desired circular orbit as shifting roller 28 moves to position 28A with the expansion of bale 40. Shifting rollers 30 through 38 are similarly restrained as they move through their individual orbits.

Shifting roller 26 is required to follow a somewhat different path because of its unique location near the pickup system 20, and due to the fact that it is in close proximity to first roller 24, shifting roller 26 therefore has a shortened path to permit its cooperation with the pickup system. In the embodiment shown, roller 26 is only required to shift a relatively short distance, but its path is, nevertheless, a circular orbit around roller 24.

Figure 2:
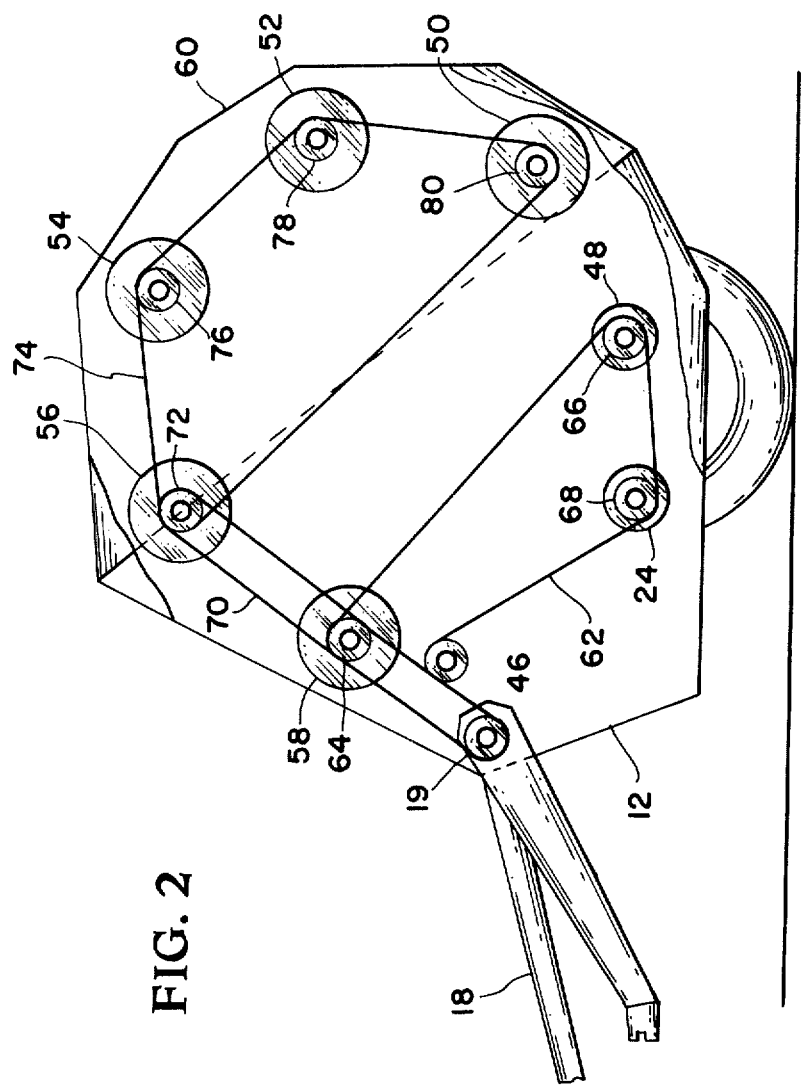
FIG. 2 is a simplified representation of the side view of the preferred embodiment of a round baler showing the drive systems for the stationary rollers.

FIG. 2 is a simplified side view of the preferred embodiment of the invention showing only the stationary rollers and the drive system for rotating them.

Frame 12 of roll baler 10 is constructed with a hinged upper frame portion which operates in the aforementioned clamshell fashion to permit unloading of the completed bale. This unloading process, shown and discussed in relation to FIG. 5 below, involves the rear portion or tailgate 60, of frame 12 lifting up to expose the bale and permit pushing the bale rearward out of the baler.

Such a configuration requires a special arrangement for driving the rollers within tailgate 60. The drive system of the preferred embodiment is shown in FIG. 2 where gear box 19, driven from drive shaft 18, drives the stationary rollers of both the front portion and tailgate 60 of frame 12 independently. Front stationary rollers 58, 48 and 24 are driven from gear box 19 by chain 62 which passes from gear box 19 to sprocket 64 on roller 58, sprocket 66 on roller 48, sprocket 68 on roller 24, around tensioning idler 46, and back to gear box 19.

The stationary rollers of tailgate 60 are driven from gear box 19 by means of separate drive chain 70 passing from gear box 19 to sprocket 72 of roller 56. Alternately they can be driven from roller 59 by use of an additional sprocket coaxially with sprocket 64 driving a shorter length of chain to sprocket 72. Roller 56 is located at the pivot point of tailgate 60 and, therefore, is the initial drive point for all of the rollers within tailgate 60. As tailgate 60 lifts or lowers no change occurs in the length of its drive chain path. Drive chain 74 progresses from sprocket 72 on roller 56 to and around sprockets 76, 78 and 80 on rollers 54, 52 and 50, respectively, and then back to sprocket 72. Since drive sprocket 72 is located at the pivot point of tailgate 60, the orientation of tailgate 60 has no effect on drive chain 74.

Figure 3:
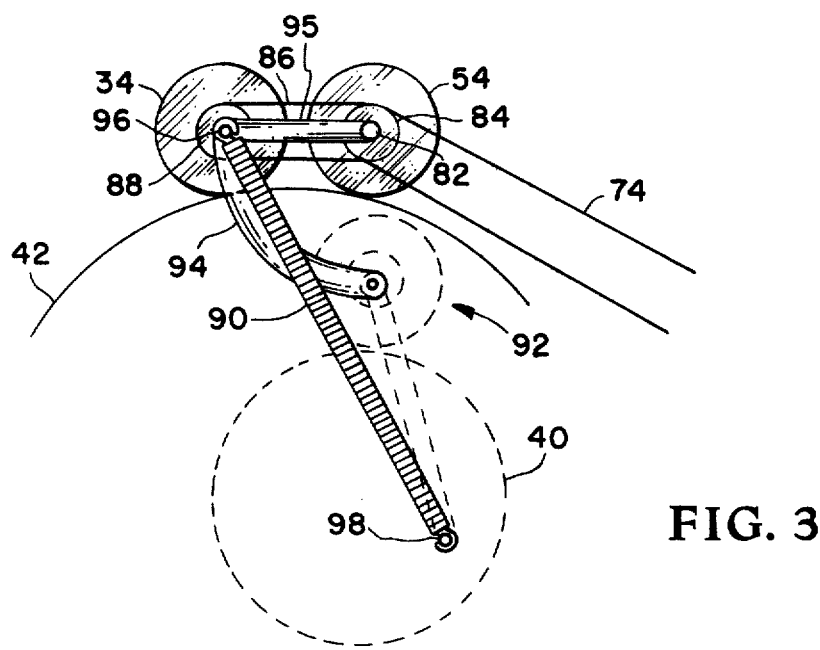
FIG. 3 is a partial side view of the preferred embodiment of the invention showing the relationship and path of one shifting roller relative to its adjacent stationary roller.

FIG. 3, a schematic representation of a single pair of rollers, shows the means for powering and controlling typical shifting roller 34 around stationary roller 54. This set of rollers is typical of all the sets, since each shifting roller of the preferred embodiment is driven from its associated stationary roller, whether the set is located within the front portion of the baler or within tailgate 60. Stationary roller 54, rotating on shaft 82, is powered by chain 74 driving sprocket 84. Stationary roller 54, in turn, drives shifting roller 34 by means of sprocket 84 driving chain 86 which drives sprocket 88 on roller 34. Spring 90 normally forces roller 34 into position 92 from which it is pushed outward as core 40 grows to bale 42. As roller 34 is pushed outward by the bale, guide slot 94, restraining shaft 96, upon which roller 34 rotates, and strut 95, assure the proper orbit of roller 34, and spring 90, attached to end cap 97 (see FIG. 4) of shaft 96, is stretched from its anchor bolt 98. The adjustment of spring 90 determines the compression forces upon the growing bale and thus determines the density of the interior of the bale.

Figure 4:
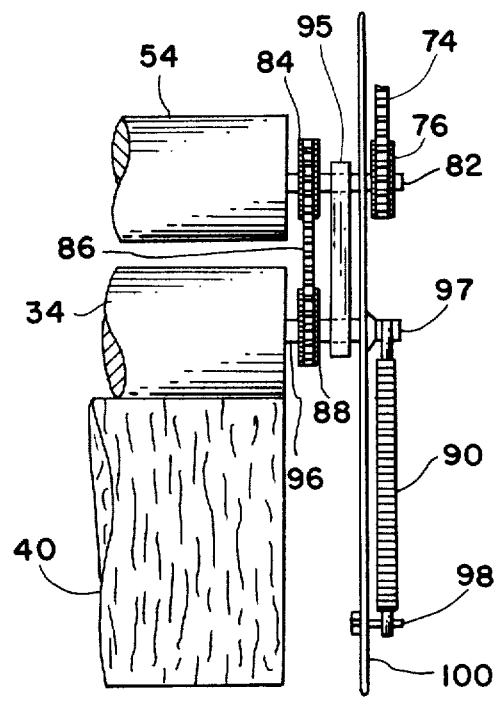
FIG. 4 is a partial view of the drive sprocket system of a pair of stationary and shifting rollers.

FIG. 4 is a partial view of the drive sprocket system of a typical roller set comprising stationary roller 54 and shifting roller 34. FIG. 4 is essentially a front view of the same arrangement as is shown in FIG. 3. Thus drive chain 74 powers sprocket 76 turning shaft 82, stationary roller 54 and sprocket 84. Sprocket 84 drives chain 86 which drives sprocket 88, turning shifting roller 34 on shaft 96.

Strut 95 maintains the circular orbit of roller 34 around roller 54 as core 40 increases in size, and spring 90 held by end cap 97 onto shaft 96 and by anchor bolt 98 onto frame member 100, determines the compressive force upon core 40.

Figure 5:
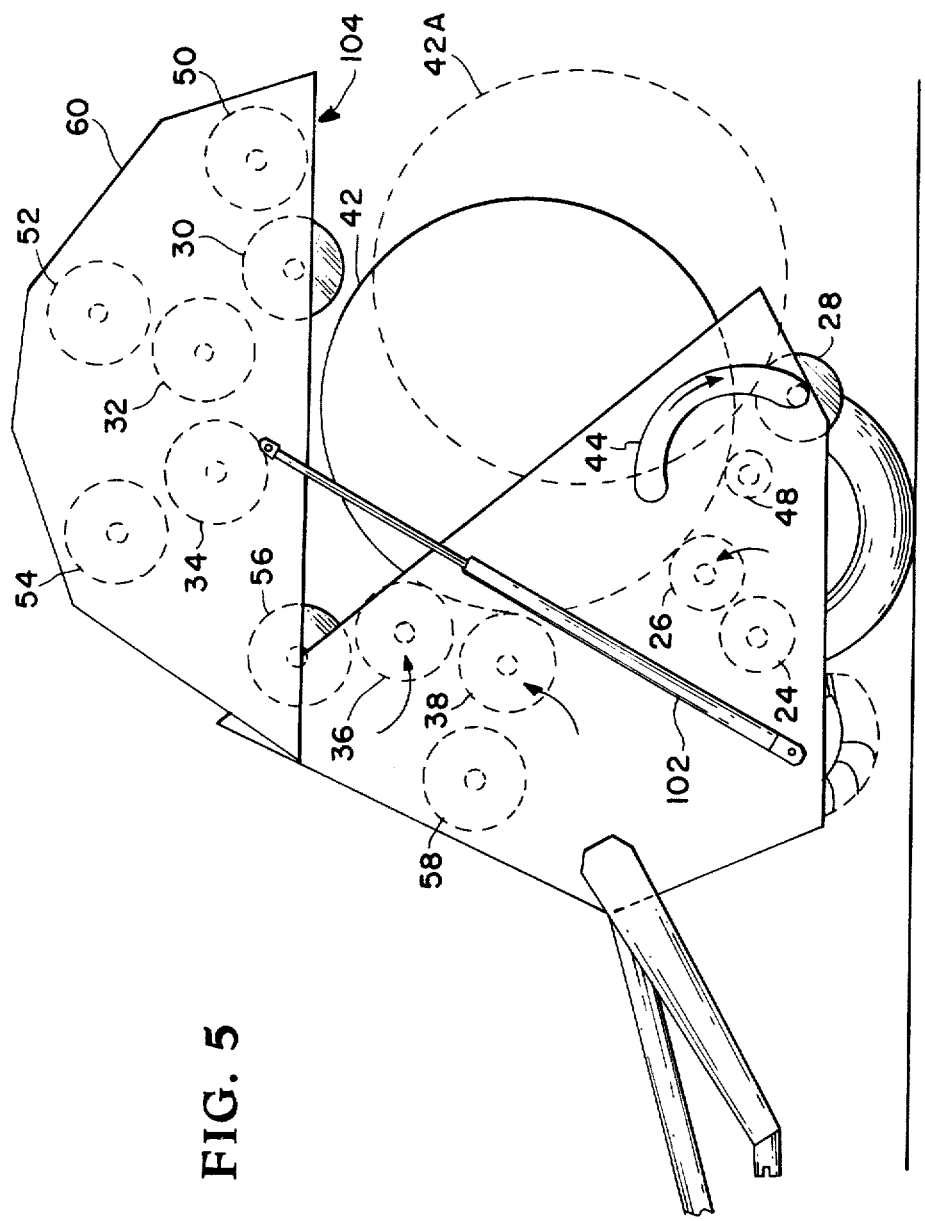
FIG. 5 is a simplified side view of the preferred embodiment of the invention showing the ejection of the bale from the baler.

FIG. 5 is a simplified side view of the preferred embodiment of the invention showing the means for ejecting the full sized bale from the baler.

When bale 42 is fully formed, tailgate 60 is raised by hydraulic piston 102 to the full open position 104 shown in FIG. 5. The raised position 104 of tailgate 60 releases bale 42 from the compressive forces of rollers 30, 50, 32, 52, 34 and 54 which no longer have contact with the bale. Shifting rollers 26, 36 and 38 are, however, still in contact with the front surface of bale 42 and the tension springs (not shown) on rollers 36 an 38 pull them rearward, while roller 26 is pulled upward, thus moving bale 42 rearward in the process. Bale 42 thus pivots around roller 48 and tips backward out of the baler. As the center of gravity of bale 42 shifts rearward, the increased weight upon shifting roller 28, and the absence of the previous support furnished by rollers 30 and 50, stretches its associated spring (not shown) and forces roller 28 lower within guide slot 44, thus permitting bale 42 to roll down to position 42A and then fall out from the baler. Ejection of completed bale 42 is thus accomplished through the combination of the raising of tailgate 60 and the inward movement of the frontmost rollers 26, 36 and 38, permitting the completed bale 42 to be urged rearwardly out of the back of the baler as described above.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, the rollers, both stationary and shifting, can be rotated by other conventional means such as hydraulic systems or gears, and restraining devices other than tension spring 90 shown can be used to control bale density. Moreover, the diameters of the shifting rollers need not be identical nor must the diameters be the same as those of the stationary rollers. The paths of the shifting rollers can be other than a circular orbit around the stationary rollers, and can be around some other convenient point of reference or can be other than circular. Independent hydraulic drives for each roller, for instance, could eliminate virtually all restraints on paths of the shifting rollers, such as having the shifting rollers move through linear paths instead of orbital paths.

What is claimed as new and desired to be secured by Letters Patent of the United States is:

1. In a round baler machine for forming cylindrical bales of windrowed agricultural crop material comprising a wheel mounted frame, power means and means for raising the crop onto the frame and into contact with multiple rotating rollers which impart motion to the crop material to form a bale of cylindrical shape completely enclosed within the machine, the improvement comprising: means for shifting at least a portion of the rollers from a closely grouped position at the beginning of the formation of the bale to a position of expanded grouping as the final size of the bale is reached; and means for restraining the shifting rollers in their expansion paths to create compressive force on the bale wherein the final expanded grouping position of the shifting rollers is such that they act in cooperation with the stationary rollers to rotate and compress the bale in its final size and position.

2. The improvement related in claim 1 wherein the path of a shifting roller is part of a circular orbit around an adjacent stationary roller.

3. The improvement related in claim 1 wherein a shifting roller is powered by a chain drive driven from an adjacent stationary roller.

4. The improvement related in claim 1 wherein the restraining means of the shifting rollers are springs.

5. The improvement related in claim 1 wherein the means for imparting shifting motion to the rollers is the force resulting from the expansion of the forming bale.

6. The improvement related in claim 1 further comprising bale ejection means for unloading the final size bale from the baler wherein the ejection means comprises means for moving the bale rearward on the baler frame to a location where the bale weight is unsupported and falls from the frame by applying rearward directed force to the bale with the frontmost shifting rollers as they move inward when the rearmost rollers are moved away from contact with the bale.

7. The improvement related in claim 1 further comprising a clamshell tailgate and means to raise the tailgate to a height which permits unrestrained movement of the final size bale rearward on the frame.

* * * * *